United States Patent [19]

Ito et al.

[11] Patent Number: 5,390,843
[45] Date of Patent: Feb. 21, 1995

[54] METHOD OF PRODUCING A CARBURIZED CERAMIC-STEEL JOINED BODY

[75] Inventors: Masaya Ito; Masato Taniguchi, both of Aichi, Japan

[73] Assignee: NGK Spark Plug Co., Ltd., Aichi, Japan

[21] Appl. No.: 795,171

[22] Filed: Nov. 19, 1991

Related U.S. Application Data

[62] Division of Ser. No. 684,319, Apr. 12, 1991, abandoned.

[30] Foreign Application Priority Data

Apr. 17, 1990 [JP] Japan .................. 2-102491

[51] Int. Cl.$^6$ .............. B23K 1/19; B23K 35/22; F01L 1/46
[52] U.S. Cl. .............. 228/124.1; 228/122.1; 29/888.03
[58] Field of Search ........... 228/122, 124, 176, 263.12, 228/124.1, 12 R, 122.1; 29/888.03

[56] References Cited

U.S. PATENT DOCUMENTS

| | | | |
|---|---|---|---|
| 2,987,815 | 6/1961 | Zeller | 29/888.03 X |
| 3,124,869 | 3/1964 | Behnke et al. | 29/888.03 |
| 3,131,470 | 5/1964 | Waller | 29/888.03 X |
| 4,740,429 | 4/1988 | Tsuno | 428/627 |
| 4,829,950 | 5/1989 | Kanamaru et al. | 29/888.03 X |
| 4,902,358 | 2/1990 | Napier et al. | 148/528 |
| 4,988,034 | 1/1991 | Taniguchi et al. | 228/122 |
| 5,002,218 | 3/1991 | Ueoka et al. | 228/122 |
| 5,035,959 | 7/1991 | Ito et al. | 428/673 X |
| 5,076,863 | 12/1991 | Taniguti et al. | 228/122 |
| 5,185,923 | 2/1993 | Taniguchi et al. | 29/888.03 |

FOREIGN PATENT DOCUMENTS

| | | |
|---|---|---|
| 2829369 | 1/1979 | Germany. |
| 3248023C1 | 5/1984 | Germany. |
| 3510940C2 | 12/1986 | Germany. |
| 3813304A1 | 11/1988 | Germany. |
| 641045 | 8/1950 | United Kingdom ........ 428/627 |

OTHER PUBLICATIONS

Metals Handbook, 9th Ed., 1983, vol. 4, pp. 146–148, 170–171, vol. 1, pp. 628–630, vol. 6, pp. 321, 935–939, 943–945.

Tempil, Basic Guide to Ferrous Metallurgy, Phase Diagram, 1977.

Physical Metallurgy Principles, second edition, Robert E. Reed-Hill, pp. 662, 687–691, 712–719, 1973.

*Primary Examiner*—Kurt Rowan
*Assistant Examiner*—Jeanne M. Epel
*Attorney, Agent, or Firm*—Finnegan, Henderson, Farabow, Garrett & Dunner

[57] ABSTRACT

A ceramic-steel joined body includes a ceramic body of silicon nitride, zirconia, silicon carbide, boron nitride, and alumina. The joined body also includes a steel body which has its surface carburized so that the hardness of the surface is greater than the hardness of the inside of the steel body. The ceramic body and the steel body are thermally joined using a brazing material of Ag—Cu—Ti, Ag—Cu—In—Ti, Ag—Ti, Cu—Ti, Ag—Cu—Ni—Ti, Ag—Cu or Ag—Cu—In.

2 Claims, 2 Drawing Sheets

METHOD OF PRODUCING A CARBURIZED CERAMIC-STEEL JOINED BODY

This application is a division of application Ser. No. 07/684,319, filed Apr. 12, 1991, now abandoned.

BACKGROUND OF THE INVENTION

1. Field of the Invention

The present invention relates to a ceramic-steel joined body suitable for engine parts such as a tappet, a valve lifter, a rocker arm, a cam shaft, a turbo-charger rotor, and the like, and other various industrial constituent parts; and further relates to a method of producing such a joined body.

2. Related Art

Year by year, the abrasion resistance properties required for engine parts have become more severe with developments in higher-output operation and higher-speed rotation of engines. Although attention has been given to ceramics as a material capable of responding to the more severe requirements, ceramics are so expensive that it is not practical to form whole parts from the material because the cost of the product would become too great. However, severe abrasion resistance is required only for a specific portion of the parts, and it is not necessary to form whole engine parts from ceramics. In view of this, a technique of brazing a ceramic chip to a certain portion of a metal part is disclosed in Japanese Patent Unexamined Publication No. Hei-2-55809, which is commonly owned with the subject application. In this conventional technique, a metal part except for the ceramics is hardened to HRC45 or more.

There is a defect in this conventional technique in that if an entire metal part is hardened to HRC45 or more, the part is likely to break when subjected to a strong impact load.

On the other hand, if only the portion of the part where high impact strength is required is subjected to annealing in order to obtain toughness after the entire metal part has been hardened by brazing heat-treatment, problems of reduction in quality occur such as oxidation of the brazing portion or the like because the annealing temperature is high (e.g., hundreds of degrees Centigrade).

Further, in the case where quenching is performed after brazing is performed on the steel (the whole of which may have a hardness of about HRC30 through brazing heat-treatment), problems are caused by strength reduction in the brazing portion because of heat at the quenching and the increase in the number of steps after the brazing.

SUMMARY OF THE INVENTION

An object of the invention is to overcome the deficiencies in the prior art as described above. Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

To achieve the objects and in accordance with the purposes of the invention, as embodied and broadly described herein, the invention comprises a ceramic-steel joined body, comprising a ceramic body, and a steel body having its surface carburized so that the hardness of the surface is greater than the hardness of the inside of the steel body, the ceramic body being thermally joined to a portion of the steel body.

Preferably, the ceramic body is selected from the group of materials consisting of silicon nitride, zirconia, silicon carbide, boron nitride, and alumina. Further preferably the ceramic body and the steel body are joined by a brazing material selected from the group of materials comprising Ag—Cu—Ti, Ag—Cu—In—Ti, Ag—Ti, Cu—Ti, Ag—Cu—Ni—Ti, Ag—Cu, and Ag—Cu—In.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate several embodiments of the invention and together with the description, serve to explain the principles of the invention.

DETAILED DESCRIPTION OF THE PREFERRED EMBODIMENT

Figure 1:
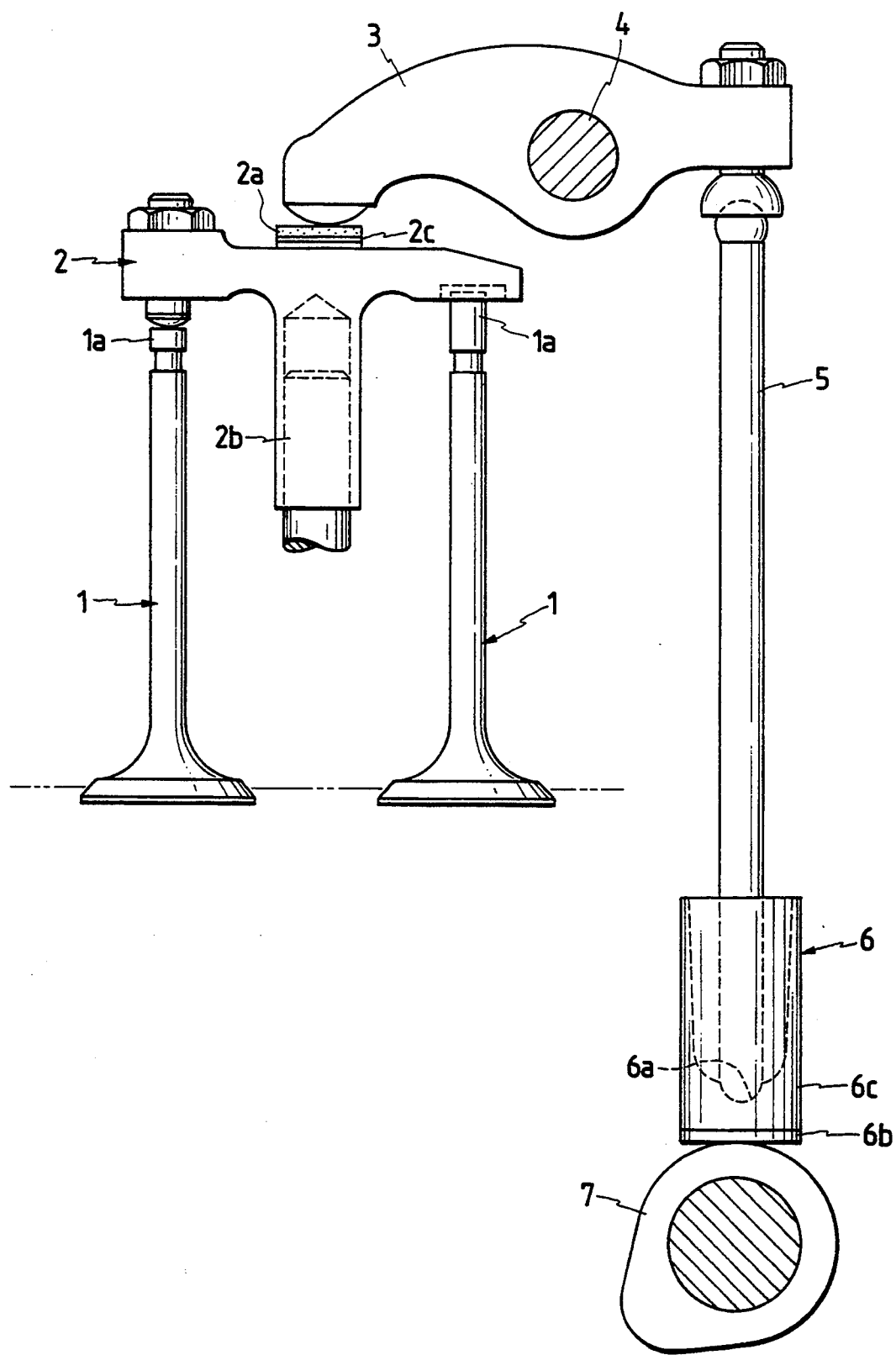
FIG. 1 is a front view showing a valve driving system.

Reference will now be made in detail to the presently preferred embodiments of the invention, examples of which are illustrated in the accompanying drawings. Wherever possible, the same reference numbers will be used throughout the drawings to refer to the same or like parts.

In order to overcome the disadvantages of the prior art, the present invention provides a ceramic-steel joined body in which ceramics are thermally joined to steel that has been subjected to carburization in its surface so that the hardness of the surface layer is made higher than the hardness of the inside.

Further, the steel is subjected to carburization except at least at the portion to be joined to ceramics so that it is possible to obtain excellent mechanical characteristics.

The foregoing joined body can be obtained through a method comprising a carburizing step for carburizing the surface of steel and a joining step for joining ceramics to the steel carburized in a thermally carburizing step.

The joined body according to the present invention is suitable for parts having a plurality of slidable portions because of the excellent abrasion resistance property of ceramics and the hardness of the surface layer of the carburized steel, and further has sufficient impact strength because the inside of the carburized steel has toughness.

Further, it is generally known that when steel is carburized, the quantity of carbon in a surface layer of the steel increases to increase the quantity of expansion of the martensite. When brazing is performed on a carburized portion, therefore, the increase of the quantity of carbon in the carburized portion produces martensite during cooling, and the martensite causes a volume expansion phenomenon which adversely affects the joined portion. Consequently, if the portion of the steel where the ceramics are brazed is not carburized, it is possible to minimize this bad influence to suppress scattering of strength in the brazing portion.

According to the method in which steel is carburized before ceramics are thermally joined, on the other hand, the quantity of carbon in the surface of the steel is increased by the carburization, and therefore the quantity of surface expansion of the steel is increased by brazing heat-treatment, so that compressive stress is applied onto the surface of the steel to strengthen the steel and improve its slidable properties and toughness.

A preferred embodiment of the present invention is described, by example, as follows.

The steel to be used is preferably a steel material such as JIS (Japan Industrial Standard) SNCM630 (which includes 0.25–0.35 wt % C, 0.15–0.35 wt % Si, 0.35–0.60 wt % Mn, 0.03 or less wt % P, 0.03 or less wt % S, 2.5–3.5 wt % Ni, 2.5–3.5 wt % Cr, and 0.5–0.7 wt % Mo), JIS SNCM616 (which includes 0.13–0.20 wt % C, 0.15–0.35 wt % Si, 0.80–1.20 wt % Mn, 0.03 or less wt % P, 0.03 or less wt % S, 2.8–3.2 wt % Ni, 1.4–1.8 wt % Cr, and 0.4–0.6 wt % Mo), or the like, having a alloy component capable of being hardened through brazing heat-treatment, or the above steel material in which the quantity of carbon has been reduced to reduce the quenched hardness of the material itself.

The carburizing conditions are as follows. Any of the methods of gas carburization, liquid carburization, and solid carburization can be used. Although the depth and hardness of the carburization are to be determined depending on the finished products, it is preferable to select the depth and hardness to be 0.1 mm–0.6 mm and HRC30–65, respectively.

For the ceramic material a silicon nitride, zirconia, silicon carbide, boron nitride, alumina, or the like can be used.

Preferably a silver brazing alloy containing Ti is used as the brazing material because it reacts on ceramics during brazing heat-treatment. The brazing material selected from an Ag—Cu—Ti group, an Ag—Cu—In—Ti group, an Ag—Ti group, a Cu—Ti group, or an Ag—Cu—Ni—Ti group is preferable. Further, the brazing material selected from an Ag—Cu group or an Ag—Cu—In group is suitable for the joining of ceramics having its surface metallized in advance.

The brazing atmosphere is preferably a non-oxidation atmosphere such as a vacuum atmosphere, or an atmosphere of Ar, $H_2$, $N_2$ or the like. Particularly in the case where the brazing material contains Ti, it is preferable to perform brazing in a vacuum or Ar. The brazing temperature should be higher than the transformation point $A_1$ of the steel material to be used.

The $A_1$ transformation point is the temperature at which the structure of the steel is changed when heating or cooling. For example, when steel is heated, the structure thereof is changed to an austenite structure at the $A_1$ transformation point. Also, when the steel is cooled, the austenite structure changes to a pearlite structure at the $A_1$ transformation point. The particular value of the $A_1$ transformation point varies in accordance with the specific amounts of additional elements and is readily identifiable by those of ordinary skill in the art given the particular steel to be used.

In the joined body according to the present invention, a stress buffering thin plate of Ni, Cu, Fe, or the like may sometimes be interposed between steel and ceramics in accordance with the requirements of the particular joined body.

In order to carburize the steel material except at the portion where brazing is performed, it is possible to use either of two methods: covering the non-carburizing portion with plating or a protecting cover, or cutting off the brazing portion after carburization is performed.

Below, referring to FIGS. 1 through 3, description will be made as to one specific application of the invention.

FIG. 1 is a schematic view showing a valve driving system in a diesel engine. Two valves 1 have valve stems 1a which abut valve bridge 2, so that the valves 1 move down at the same time as the valve bridge 2 is pressed down by rocker arm 3. Rocker arm 3 is swingably supported by shaft 4, and an upper end of push rod 5 abuts against one end of rocker arm 3. Push rod 5 slidably contacts cam 7 through tappet 6 so as to move up and down with the rotation of cam 7 to thereby swing rocker arm 3 so that valves 1 are opened and closed (or moved up and down) by the swinging operation of rocker arm 3.

Figure 2:
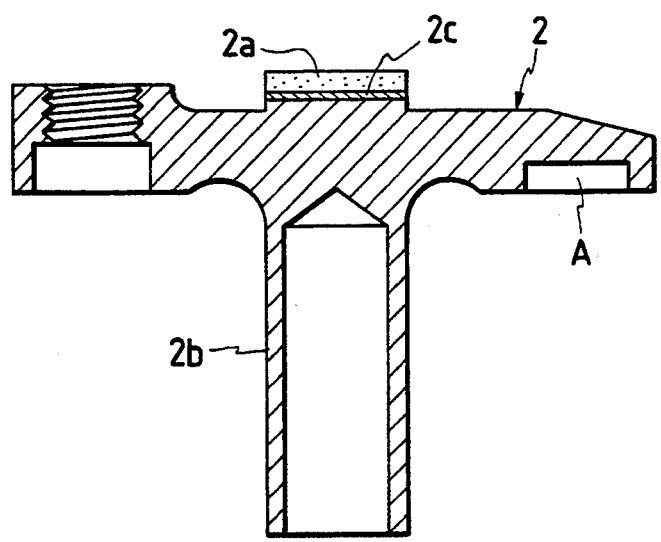
FIG. 2 is a vertical sectional view showing a valve bridge.

FIG. 2 is a vertical sectional view showing the valve bridge 2 of FIG. 1. A front end portion of rocker arm 3 slides on a top portion of valve bridge 2 so that the surface pressure is high, resulting in a problem of abrasion in this portion. Consequently, a configuration where the top portion 2a is formed of ceramics and brazed to valve bridge body (metal) 2b with a silver brazing alloy is very effective. If the metal hardness cannot be obtained by heat-treatment at the time of brazing, a problem occurs in that a portion A, on which the end of valve stem 1a abuts, is worn away or fatigued due to insufficient metal hardness.

According to the present invention, sufficient hardness can be obtained over the whole metal surface through carburization, and the foregoing problems are eliminated. The specific method for producing this embodiment will be described hereunder:

1. The ceramics portion 2a is formed through the steps of: mixing an $Y_2O_3$—$Al_2O_3$ group sintering additives with 90 weight percent of silicon nitride; adding a molding binder to the mixture and molding the material with a die press into a molding in the form of a rectangular plate; sintering the molding at 1700°–1800° C. in an atmosphere of $N_2$ to obtain a rectangular plate-like sintered matter of silicon nitride; and lapping the end surfaces of the sintered matter to obtain a 20×14×3 mm(t) ceramic plate.
2. The valve bridge body 2b was formed of JIS SNCM616 through cold-forging and then subjected to gas carburizing treatment at 900° C. for two hours.
3. After so carburizing the top surface of the valve bridge body 2b, the hardened surface underlying the ceramic portion 2a is removed by grinding, a stress buffering Cu plate 2c of 0.5 mm was sandwiched between the ceramics portion 2a and the valve bridge body 2b, held in a vacuum with an active brazing material of an Ag—Cu—Ti group at 850° C. for 20 minutes, and then joined together by cooling the furnace.

The surface hardness of the metal portion of the thus completed valve bridge 2 was HRC60.

Figure 3:
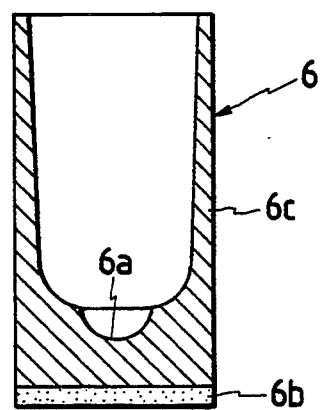
FIG. 3 is a vertical sectional view showing a tappet.

FIG. 3 is a vertical sectional view showing tappet 6 of FIG. 1. A lower end of push rod 5 slides on recess portion 6a of tappet 6, and cam 7 slides on the lower surface 6b of tappet 6. Also in this case, the lower surface 6b of tappet 6 on which sliding is most abrasive is formed of ceramics, and tappet body 6c is formed of metal.

The method of producing this tappet will be described hereunder:

1. Ceramics portion 6b was formed through the steps of: mixing an $Y_2O_3$—$Al_2O_3$—AlN group sintering additives with a 90 weight percent of silicon nitride; adding a molding binder to the mixture and molding the thus obtained matter with a die press into a molding; sintering the molding in an atmosphere of $N_2$; and grinding the sintered matter to obtain a 20($\phi$)×2 mm(t) disc-like matter.
2. The tappet body 6c was formed through a process in which JIS SNCM630 was formed into a cylindrical shape with a bottom through cold-forging and then subjected to gas carburizing treatment at 900° C. for two hours. In this case, Cu plating is placed in the vicinity of the brazing portion in advance so that carburization is not performed on the brazing portion. Then, after carburization, the brazing surface and the outer peripheral portion is exposed by grinding off the protective copper plate.
3. The ceramic portion 6b and the tappet body 6c are held with an active brazing material of an In—Cu—Ag—Ti group interposed therebetween in a vacuum at 790° C. for 20 minutes, and then joined together by cooling the furnace.

In this example, the surface to which the ceramics portion 6b was joined was not carburized because the quantity of carbon in the steel surface was suppressed to reduce the extent of volume expansion of martensite so as to stabilize the joining strength.

Table 1 shows a comparison of the shearing strength between test pieces of a SNCM616 metal body of 15($\phi$)×20 mm(l) and a silicon nitride sintered matter of 15($\phi$)×2 mm(t) in which brazing was performed under the same conditions (using an active brazing material of an In—Cu—Ag—Ti group; holding at 790° C. for 20 minutes in a vacuum; and joining by cooling the furnace). In Table 1, case I shows a test piece in which carburization and the like were not performed at all, case II shows a test piece in which the whole surface was carburized, and case III shows a test piece in which carburization was performed except at the joining surface. In case III, the metal body was carburized in the state where a joining portion of the metal body was temporarily covered with a cap-like protecting cover of 16 mm($\phi$)×5 mm(height) so that the portion of the metal body except for the joining surface was carburized. Then, the protecting cover was removed, and the non-carburized portion had 0.5 mm cut off.

TABLE 1

| Shearing strength | Case I (Non-carburization) (hardness HRC 37) | Case II (Whole Surface carburization) (hardness HRC 58) | Case III Carburization (except joining portion) (hardness HRC 58) |
|---|---|---|---|
| 1 | 3500 Kgf | 3250 Kgf | 3200 Kgf |
| 2 | 3850 Kgf | 2400 Kgf | 3350 Kgf |
| 3 | 3300 Kgf | 2800 Kgf | 3950 Kgf |
| 4 | 3050 Kgf | 2500 Kgf | 3200 Kgf |
| 5 | 3600 Kgf | 2350 Kgf | 3300 Kgf |
| Average | 3460 Kgf | 2660 Kgf | 3400 Kgf |

As seen from Table 1, in case II strength was reduced and scattering was slightly increased, and substantially the same results were obtained in both cases I and III.

As described above, in the ceramic-steel joined material according to the present invention, the following effects are achieved. The joined body is suitable for parts having a plurality of slidable portions because of the excellent abrasion resistance properties of ceramics and the hardness of a surface layer of carburized steel, and further has sufficient impact strength because the inside of the carburized steel has toughness. Moreover, the degree of hardening of the surface can be desirably set by the carburizing treatment conditions. Steel is carburized except the portion where ceramics are brazed so that it is possible to minimize scattering of the strength in the brazing portion. According to the producing method in which steel is carburized in a step before ceramics are joined by heating, compressive stress is applied onto the surface of the steel by brazing heat-treatment to strengthen the steel so that the toughness and the slidable properties are improved.

It will be apparent to those skilled in the art the various modifications and variations can be made in the ceramic-steel body of the present invention and in construction of this joined body without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of producing a joined body of ceramic and steel, comprising the steps of:
   selecting a steel which is hardened by heat treatment of brazing;
   carburizing the steel prior to brazing:
   removing a carburized portion of the steel, the portion being at a location where the steel is to be brazed to the ceramic; and
   brazing the steel and the ceramic at a temperature higher than the $A_1$ transformation point.

2. A method of producing a joined body of ceramic and steel, comprising the steps of:
   selecting a steel which is hardened by heat treatment of brazing;
   carburizing the steel prior to brazing while simultaneously excluding a portion of the steel from the carburizing, the portion being at a location where the steel is to be brazed to the ceramic; and
   brazing the steel and the ceramic at a temperature higher than the $A_1$ transformation point.

* * * * *